United States Patent [19]

Smith

[11] 4,093,043

[45] June 6, 1978

[54] CALIPER TYPE DISC BRAKE
[75] Inventor: Philip A. Smith, Troy, Ohio
[73] Assignee: The B. F. Goodrich Company, Akron, Ohio
[21] Appl. No.: 778,533
[22] Filed: Mar. 17, 1977
[51] Int. Cl.² .................... F16D 55/228; F16D 65/04
[52] U.S. Cl. .................................. 188/73.6; 188/72.5
[58] Field of Search ..................... 188/72.5, 73.1, 73.6

[56] References Cited
U.S. PATENT DOCUMENTS 3,862,674  1/1975  Vananrooy .................... 188/73.6 X

FOREIGN PATENT DOCUMENTS 6,618,362  6/1967  Netherlands ....................... 188/73.3

Primary Examiner—Duane A. Reger
Attorney, Agent, or Firm—W. A. Shira, Jr.; F. K. Lacher

[57] ABSTRACT

A caliper brake having a brake disc rotatable about an axis with a friction lining carrier mounted for sliding movement axially of the brake disc on a supporting caliper housing. The lining carrier has two circumferentially spaced ends with an opening at one end for receiving a torque pin mounted on the caliper housing for axial sliding movement of the carrier on the pin. A slot is provided at the other end for receiving a retention pin which is mounted on the caliper housing for axial sliding movement of the carrier on the retention pin. The retention pin is positioned in the slot with sufficient clearance to accommodate movement in the circumferential direction due to expansion and contraction of the carrier during braking. The clearance between the torque pin and the opening in the lining carrier is only sufficient to prevent binding of the carrier on the torque pin and therefore limits the movement of the lining carrier in a circumferential direction while providing a sliding connection for axial movement of the carrier into and out of braking engagement with the brake disc.

8 Claims, 5 Drawing Figures

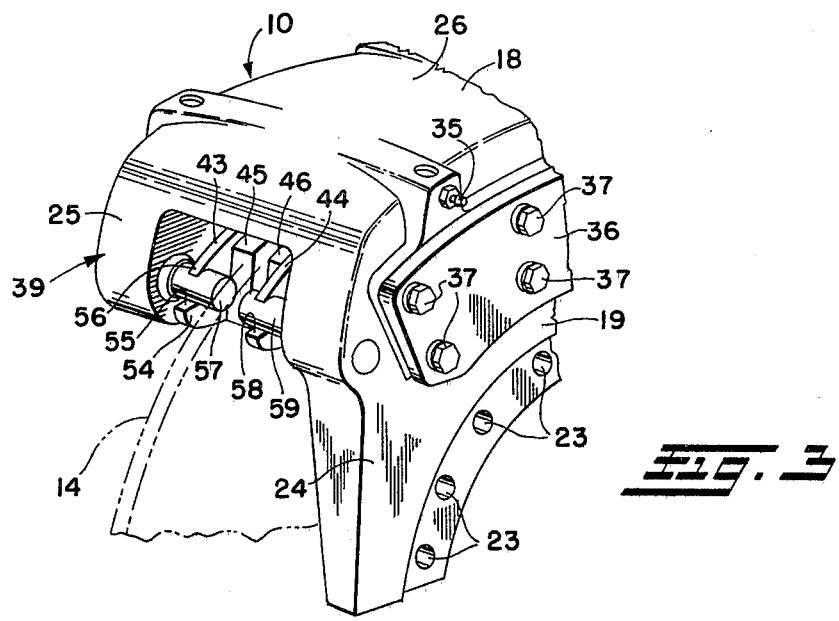
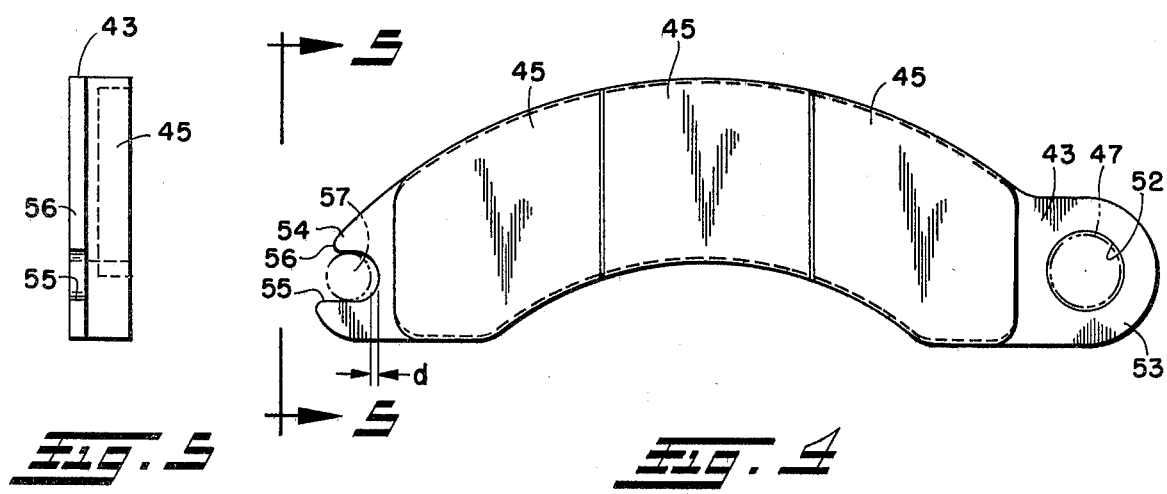

CALIPER TYPE DISC BRAKE

BACKGROUND OF THE INVENTION

This invention relates to a caliper brake and especially to the connection of the lining carrier to the caliper housing. In a caliper brake at least one of the lining carriers is slidably mounted on the housing for movement of the carrier into braking engagement with the brake disc. This movement is in an axial direction relative to the brake disc, and clearance between the carrier and trogue pins or thrust plate is necessary to permit movement. The amount of clearance is a function of the length of the lining carrier between the trogue pins or thrust plates and the temperature changes in the carrier during braking. In the past, lining carriers have been slidably supported on torque pins extending through semicircular cutouts at each end of the carriers. The distance between the cutouts is less than the distance between the torque pins to provide the necessary clearance for thermal expansion and contraction of the linging carriers.

At normal braking temperatures, brakes with torque pins at both ends of the lining carrier have had up to .060 inches or more end-to-end movement with forward and reverse braking. This movement across the face of the actuating pistons after the brake is actuated pulls the piston to one side or the other causing side loading and damage to the piston surface, cylinder bore and the piston seals. This problem may also be present with brake designs of the type shown in applicant's Pat No. 3,357,524 where lugs on the ends of the lining carriers slidably engage slots in end plates of the housing. In another brake construction, the slots or notches are at both ends of the lining carrier and torque pins or lugs on the caliper housing fit in the slots or notches to transmit the torque. In all cases, the clearance must be sufficient to prevent binding of the lining carrier on the pins or lugs; however, this clearance has also caused the damage to the piston surface, cylinder bore and piston seals with lining carriers of normal length. Shortening the lining carrier will reduce the amount of expansion during braking but this in not a practical solution because of the cost of additional lining carriers and actuating mechanism.

SUMMARY OF THE INVENTION

The caliper brake of the present invention provides the necessary sliding clearance for elongation and contraction of the lining carrier while at the same time the circumferential movement of the lining carrier is limited to reduce or eliminate the damage to the actuating piston surface, cylinder bore and piston seals. One end of the lining carrier is slidably mounted on a torque pin with an opening of minimal clearance to take care of the relative expansion and contraction of the torque pin and manufacturing tolerances but no clearance for expansion and contraction of the lining carrier. The other end of the lining carrier has a slot for slidably receiving a retention pin in a position spaced from the ends of the slot. The retention pin is mounted on the housing and extends through the slot at a position spaced from the ends of the slot a distance at least as great as the total clearance needed for expansion and contraction of the lining carrier. No torque is transmitted through the retention pin and sufficient clearance is provided to prevent binding in the event the lining carrier is distorted or warped under the heat generated by the braking. With this construction, the circumferential movement of the lining carrier is limited because of the close clearance of the torque pin in the lining carrier opening. The lining carrier movement is limited to the clearance between the hole diameter and the pin diameter. The pin-to-hole clearance is limited by manufacturing tolerances and the clearance needed to prevent binding of the carrier on the pin in the event of tapered lining wear. In a comparable brake of the construction used heretofore, the reduction of circumferential lining movement with the design described herein may be from 500 to 1000 percent. Accordingly, the possibility of damage to the piston surface, cylinder bore and piston seal is greatly reduced. The construction of this invention is also less costly because it reduces the number of torque pins required and less material is required for the torque plate since the torque is only taken out at one end of the lining carrier. Also with the slotted construction, the lining carrier may be removed and replaced simply by removing the torgue pin and rotating the carrier out of the brake.

The accompanying drawings show one preferred form of caliper brake made in accordance with and embodying this invention and which is representative of how this invention is practiced.

BRIEF DESCRIPTION OF THE DRAWINGS

FIG. 3 is a fragmentary view in perspective of one end of the caliper brake with the brake disc being shown in chain-dotted lines.

FIG. 4 is a side elevation of the lining carrier showing the positions of the retaining pin and torque pin in chain-dotted lines.

FIG. 5 is an end view of the lining carrier taken along the plane of line 5—5 in FIG. 4.

DETAILED DESCRIPTION

Figure 1:
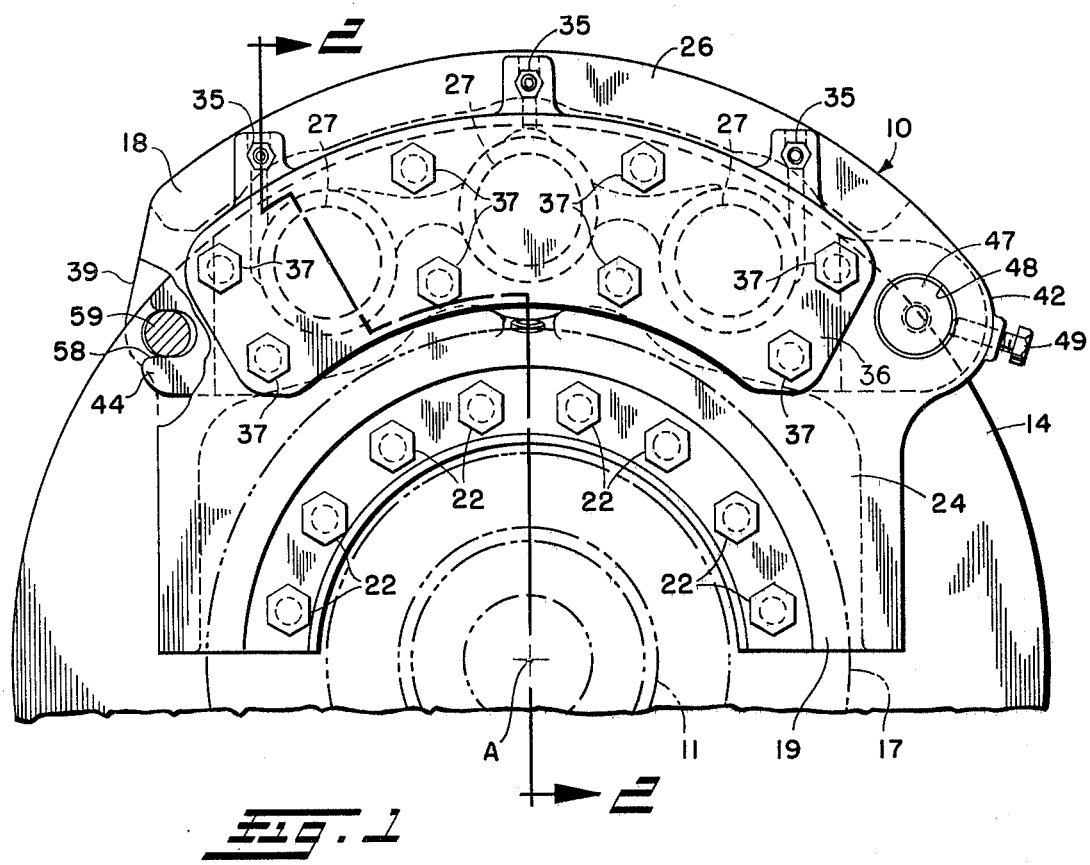
FIG. 1 is a side elevation of a caliper brake embodying the invention with parts borken away to show the slot and pin connection.
Figure 2:
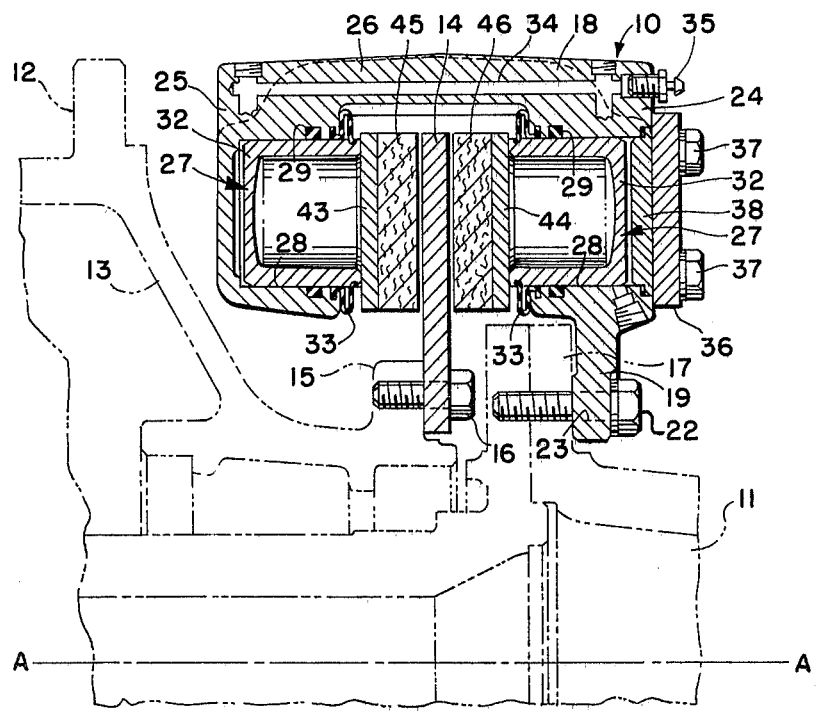
FIG. 2 is a sectional view taken along the planes of lines 2—2 of FIG. 1 with the wheel and hub shown in phantom lines.

Referring to FIGS. 1, 2 and 3, caliper brake assembly 10 is shown mounted on an axle housing 11. A wheel 12 having a flange 13 may be rotatably mounted on the axle housing 11 about an axis A—A of the axle and axle housing. A brake disc 14 is fastened to a cast mounting ring 15 on the flange 13 by cap screws 16 extending through the brake disc and into threaded engagement with threaded holes in the mounting ring at circumferentially spaced-apart positions around the flange.

The axle housing 11 has a radially extending supporting flange 17 on which the caliper brake assembly 10 may be mounted. A supporting body or caliper housing 18 has a mounting flange 19 which fastens to the flange 17 of the axle housing 11 by cap screws 22 extending through holes 23 in the mounting flange 19 and in threaded engagement with threaded holes in the flange 17 at circumferentially spaced-apart positions. The mounting flange 19 may be part of an inboard side 24 of the housing 18 which has an outboard side 25 and an outer body piece 26 connecting the inboard side and outboard side. The outer body piece 26 is disposed transversely of the barke disc 14 and the integral inboard side 24 and outboard side 25 flank the opposite sides of the disc and cooperate to maintain the brake actuating mechanism consisting of a group of piston-cylinder assemblies 27.

On each inboard side 24 and outboard side 25 of the housing 18, piston-cylinder assemblies 27 are mounted. The internal details of two of these piston-cylinder assemblies 27 are best shown in FIG. 2. The assemblies 27 have cylinder bores 28 in the housing inboard side 24 and outboard side 25 and sealing rings 29 in the bores provide fluid seals between pistons 32 slidably positioned in the cylinder bores. Each of the piston-cylinder assemblies 27 further includes annular flexible rubber boots 33 between the pistons 32 and the housing 18 to protect the sliding external surfaces of the pistons from damage by dirt, corrosion, etc. Fluid passages 34 are provided in the outer body piece 26 of the housing 18 leading from a bleeder valve 35 for each pair of piston-cylinder assemblies 27 to the cylinder bores 28 of the respective piston-cylinder assemblies. One of the bleeder valves 35 is connected by suitable piping or flexible hose to a source of fluid pressure (not shown) for hydraulic actuation of the brake mechanism through communication of a brake fluid in any appropriate way to the passages 34 in the housing 18. An access plate 36 is fastened by cap screws 37 to the face of the inboard side 24 of the housing 18 and retain cylinder head plates 38 in the cylinder bores 28 at the inboard side 24.

Referring again to FIGS. 1 and 3, the caliper housing 18 has a first end 39 shown at the left in FIG. 1 and a second end 42 shown to the right in FIG. 1 with arcuate friction lining carriers 43 and 44 extending circumferentially of the brake disc from the first end to the second end of the housing. Friction linings 45 and 46 which may be either of an organic or metallic type abrasive lining material well known in the art are fastened to the lining carriers 43 and 44, respectively, by suitable adhesives or other forms of fasteners (not shown). As shown in FIG. 4, the friction lining 45 may be in three segments at circumferentially spaced positions along the friction lining carrier 43.

At the second end 42 of the housing 18, torque thrust pins 47 extend through a hole 48 in the inboard side 24 and a hole in the outboard side 25 (not shown). The torque thrust pins 47 are held in place in the holes by set screws 49 in threaded engagement with threaded holes in the side pieces 24 and 25 with the ends of the set screws engageable with the surface of the torque thrust pins as shown in FIG. 1. The torque thrust pins 47 extend into openings such as hole 52 in the friction lining carrier 43 at a second end 53 of the friction lining carrier 43, corresponding to the second end 42 of the housing, as shown in FIG. 4. Preferably the torque thrust pins 47 are cylindrical and fit in the holes of friction lining carriers 43 and 44 with a minimum diametral clearance to meet the design criteria and the available production tolerance capability. Thus minimum clearance is provided for sliding of the friction lining carriers toward or away from the brake disc 14 during operation of the brake.

At the other or first end 54 of the lining carrier 43, a slot 55 with a centerline extending in a direction toward the torque pin hole 52 is provided at an outer edge 56. The edges of the slot 55 are in sliding engagement with a retention pin 57 extending axially of the brake disc 14 and fastened as by set screws or welding to the outboard side 25 of the caliper housing 18. The retention pin 57 may be located at a position spaced from the end of the slot 55 a distance "d" which may be around 0.060 inches or large enough to accommodate linear thermal expansion of the carrier, and the pin has a clearance of around 0.010 inches at the upper and lower sides of the slot. The slot 55 is open at the outer edge 56 so that the friction lining carrier 43 may be removed for replacement simply by removing the torque thrust pins 47 and withdrawing the lining carrier from between the brake disc 14 and the adjoining outboard side 25 of the caliper housing by moving them in a direction parallel to the braking surface of the braking disc. The friction lining carrier 44 has a similar construction to friction lining carrier 43 with a slot 58 slidably mounted on a retention pin 59 on the inboard side 24. The friction lining carrier 44 may be removed in the same manner as lining carrier 43. During this process the friction lining carriers 43 and 44 are slid off the retention pins 57 and 59 at the first end 39 of the caliper housing 18. New friction lining carriers 43 and 44 are inserted according to the reverse procedure.

In the above description, the friction lining carrier 43 has been described along with its relationship to one of the torque thrust pins 47 and the retention pin 57 for the outboard side 25 of the caliper housing 18 and it is understood that the friction lining carrier 44 has the same construction except that it is a mirror image for positioning on the other side of the brake disc 14 with one of the torque thrust pins 47 and retention pin 59 mounted on the inboard side 24 of the caliper housing.

In operation, the brake assembly 10 is hydraulically actuated by a source of fluid pressure communicated to the passages 34 and transmitted to the cylinder bores 28 urging the pistons 32 into engagement with the friction lining carriers 43 and 44 for compression of the friction linings 45 and 46 against the moving surfaces of the rotatable brake disc 14. As the friction lining carriers 43 and 44 are urged against the brake disc 14, there is only limited circumferential movement of the friction lining carriers because of the relatively small clearance between the torque thrust pins 47 and the holes in the friction lining carriers. During braking, heat is generated and the friction lining carriers 43 and 44 will be elongated. This elongation will be accommodated by the clearance "d" between the retention pins 57, 59 and the ends of the slots 55, 58. Since the elongation and contraction of the friction lining carriers 43 and 44 takes place at a relatively slow rate, the forces on the pistons 32 will not be sufficient to cause the side loading with resulting damage to the piston surfaces, cylinder bores 28 and piston sealing rings 29. At the same time, the slotted connection will accommodate an appreciable amount of warpage or twisting of the friction lining carriers 43 and 44 to provide unimpeded sliding of the lining carriers on the torque thrust pins 47.

The invention is capable of other modifications and adaptions by those having ordinary skill in the art and is more particularly defined by the appended claims.

I claim:

1. A caliper brake having a brake disc rotatable about an axis, a supporting body, a lining carrier positioned in a direction at one side of said disc, said lining carrier having ends spaced generally circumferentially of said disc, a first one of said ends having an opening for receiving a cylindrical torque pin mounted on said supporting body and extending axially of said disc to support said lining carrier and permit axial sliding movement of said lining carrier into and out of braking engagement with said disc, said opening comprising a round hole with the diametral clearance between said pin and the wall of said hole being the minumum required for sliding of said lining carrier axially of said disc, retention means between a second one of said ends and said supporting body for supporting said lining carrier in position, said retention means supporting said lining carrier while permitting sliding movement axially of said disc as well as circumferential movement toward and away from said torque pin to accommodate expansion and contraction of said lining carrier due to changes in temperature caused by the heat generated during braking and brake actuating means in engagement with said lining carrier moving said lining carrier axially into braking engagement with said disc.

2. A caliper brake according to claim 1 wherein said retention means includes retention members with a first member extending axially of said disc in sliding engagement with a second member and one of said members being mounted on said supporting body and the other of said members being part of said lining carrier.

3. A caliper brake according to claim 2 wherein said first member is mounted on said supporting body and said second member is part of said lining carrier.

4. A caliper brake according to claim 3 wherein said first member includes at least one pin extending in a direction axially of said disc into a slot in said lining carrier at said second end.

5. A caliper brake according to claim 4 wherein said slot has a centerline extending towards said opening for said torque pin, and said slot extends to the edge of said lining carrier for removal of said lining carrier in a direction circumferentially of said disc when said torque pin is removed.

6. A caliper brake according to claim 5 wherein said torque pin is releasably mounted on said supporting body.

7. A caliper brake according to claim 1 wherein said brake actuating means includes a fluid actuated cylinder and piston assembly positioned generally axially of said disc and said piston being engageable with said lining carrier.

8. A caliper brake according to claim 7 wherein said supporting body is a caliper housing and contains a cylinder of said assembly for receiving a piston of said assembly in sliding relationship.

* * * * *